UNITED STATES PATENT OFFICE.

CHARLES S. BOYNTON AND WILLIAM J. VAN PATTEN, OF BURLINGTON, VERMONT, ASSIGNORS TO THE WELLS & RICHARDSON COMPANY, OF SAME PLACE.

FOOD PRODUCT FROM CEREALS.

SPECIFICATION forming part of Letters Patent No. 344,717, dated June 29, 1886.

Application filed April 3, 1886. Serial No. 197,710. (Specimens.)

*To all whom it may concern:*

Be it known that we, CHARLES S. BOYNTON and WILLIAM J. VAN PATTEN, both of the city of Burlington, in the State of Vermont, have invented a certain new and useful Improvement in the Preparation of Food Products Obtained from the Various Cereal Grains, of which the following is a specification.

This invention has reference to products—such as grits, flour, crushed grain, meal, &c.—obtained from cereal grains and intended for food; and its object is to obtain a new series of such products, in which shall be combined, with the material nutritive properties of the grain, the self-digesting agent diastase, in such manner as to produce food of superior flavor, of greater nutritive value, and of more easy digestibility.

The invention is not directed to obtaining prepared foods or food compositions—such as are on the market for the use of invalids and children—but rather to the treatment and preparation of the various known cereal grain products now on the market in such manner as to improve them in the respects above noted, while leaving them still as fitted for general use as before—that is to say, the product treated—as, for instance, grits, cracked wheat, flour, or the like—would still remain grits, cracked wheat, or flour, and susceptible of being put to all uses for which such products are usually intended. By treating the grain with diastase a partial transformation of the starch of the product into dextrine is accomplished, there being thus produced in the article one of those agents classed as "peptogens," which are capable, when introduced into the stomach, of promoting the healthy secretion of pepsin, the natural digestive agent, while at the same time the food product is of itself much more digestible, inasmuch as dextrine is a soluble form of starch.

To enable others skilled in the art to understand and use the invention, a more particular description will now be given of the manner in which it is preferred to practice it.

Take any of the cereal grains—wheat, oats, barley, maize, rice, &c.—which, after being deprived of the outer husk, are crushed, ground, or granulated, as may be desired. The grain is then subjected to a heat of, say, 180° Fahrenheit, for the purpose of depriving it of its natural moisture, and thus bringing it to a condition in which the absorption of the liquid containing the diastase will be rendered more uniform and complete. To this dried product is added a solution of diastase. The said solution is obtained by macerating, say, fifty (50) pounds of fresh barley malt with twenty (20) gallons of water at a temperature of 160° Fahrenheit. Of the liquid thus obtained take one-eighth part, by weight, for each part, by weight, of the grain to be treated. After the solution of diastase has been added to and mixed with the dried product, the latter is at once placed in a drying-room, where a temperature ranging from 160° Fahrenheit to 175° Fahrenheit is maintained. We do not restrict ourselves, however, to this precise range of temperature. What is essential is, that the heat should not be so great as to burn, scorch, or cook the article under treatment. The product there remains until thoroughly dried, and when thoroughly dried it is ready for use.

In practicing the invention it is necessary to take great care that the action of the diastase upon the starch of the grain is not carried to that extent to transform it into grape-sugar, as by so doing the food would become a nearly-liquid mass with a disagreeable sweet taste, entirely unfit for the use intended, which, as before stated, is a food for general use.

It is of course to be understood that the invention in its practical application is not limited to the exact proportions and quantities hereinbefore stated. In some cases the malted barley is richer in diastase than others, and so different proportions may be required to produce the same effect. Some cereal grains, also, being richer in starch than others, require a larger proportion of the diastase solution. Solutions of diastase, also, can be obtained from other bodies than malted grain, as from cerealine, although it is believed that the solution of diastase from malted grain is practically the best. Either kind, however, may be used in carrying out the invention.

Having now described the invention, and the best way known to us of carrying the same into effect, what we claim herein as new and of our own invention is—

As a new manufacture, an uncooked cereal food product consisting of any of the cereal
5 grains, crushed, ground, or granulated, and impregnated with diastase, substantially as hereinbefore set forth.

In testimony whereof we have hereunto set our hands this 3d day of March, 1886.

CHARLES S. BOYNTON.
  WILLIAM J. VAN PATTEN.

Witnesses:
 GEO. W. WALES,
 JENNIE STACY.